United States Patent
Wudy et al.

(10) Patent No.: US 12,110,954 B2
(45) Date of Patent: Oct. 8, 2024

(54) ELECTRONIC LOCKING DIFFERENTIAL WITH POSITION SENSOR

(71) Applicant: Eaton Intelligent Power Limited, Dublin (IE)

(72) Inventors: Jeremy Wudy, Burlington, MN (US); Jeffrey Oesch, Dublin (IE)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/548,665

(22) PCT Filed: Mar. 7, 2022

(86) PCT No.: PCT/EP2022/025084
§ 371 (c)(1),
(2) Date: Sep. 1, 2023

(87) PCT Pub. No.: WO2022/184328
PCT Pub. Date: Sep. 9, 2022

(65) Prior Publication Data
US 2024/0141976 A1    May 2, 2024

Related U.S. Application Data

(60) Provisional application No. 63/157,017, filed on Mar. 5, 2021.

(51) Int. Cl.
*F16H 48/34* (2012.01)
*B60K 23/04* (2006.01)

(52) U.S. Cl.
CPC ............ *F16H 48/34* (2013.01); *B60K 23/04* (2013.01); *B60K 2023/046* (2013.01)

(58) Field of Classification Search
CPC .......... F16H 48/34; F16H 48/08; F16H 48/22; F16H 48/24
See application file for complete search history.

(56) References Cited

U.S. PATENT DOCUMENTS

| | | | |
|---|---|---|---|
| 7,022,040 B2 | 4/2006 | DeGowske et al. | |
| 7,264,568 B2 | 9/2007 | Ludwig et al. | |

(Continued)

FOREIGN PATENT DOCUMENTS

| | | |
|---|---|---|
| CN | 210003771 U | 1/2020 |
| EP | 1908621 | 4/2008 |

(Continued)

OTHER PUBLICATIONS

International Search Report and Written Opinion for PCT/EP2022/025084, mailed May 19, 2022.

*Primary Examiner* — Tisha D Lewis
(74) *Attorney, Agent, or Firm* — Merchant & Gould P.C.

(57) ABSTRACT

An electronic locking differential assembly includes a ring gear including at least one bore formed therein. An electronic actuation mechanism is positioned behind the ring gear on one side of the ring gear. A retaining ring includes a notch formed thereon on an outer circumference of the retaining ring. A portion of the electronic actuation mechanism is disposed in the notch. A lock plate is positioned on a side of the ring gear opposite the electronic actuation mechanism. The retaining ring includes a bore formed therein and a fastener disposed in the bore. The fastener is coupled to the retaining ring and passes through the at least one bore of the ring gear. The fastener is coupled to the lock plate wherein the electronic actuation mechanism is axially connected to the lock plate selectively locking and unlocking the differential.

13 Claims, 3 Drawing Sheets

(56) References Cited

U.S. PATENT DOCUMENTS

| | | |
|---|---|---|
| 7,862,462 B2 | 1/2011 | Fusegi |
| 9,556,945 B2 | 1/2017 | Fox |
| 9,625,026 B2 | 4/2017 | Cochren et al. |
| 9,657,827 B2 | 5/2017 | Gopal et al. |
| 9,933,060 B2 | 4/2018 | Cochren et al. |
| 11,326,679 B2 | 5/2022 | Borgaonkar et al. |
| 11,396,935 B2 | 7/2022 | Allen |
| 2007/0197338 A1 | 8/2007 | Fusegi |
| 2015/0133254 A1* | 5/2015 | Fox .................. F16H 48/22 |
| | | 475/150 |
| 2019/0226566 A1 | 7/2019 | Hillman et al. |
| 2019/0383378 A1 | 12/2019 | Surve et al. |
| 2020/0116245 A1 | 4/2020 | Fritz et al. |
| 2021/0131542 A1* | 5/2021 | Allen .................. F16H 48/34 |

FOREIGN PATENT DOCUMENTS

| | | |
|---|---|---|
| JP | 2004208460 | 7/2004 |
| WO | 2007069042 | 6/2007 |
| WO | 2013176866 A1 | 11/2013 |
| WO | 2014116802 | 7/2014 |
| WO | 2015060890 | 4/2015 |
| WO | 2015078488 | 6/2015 |
| WO | 2017100550 | 6/2017 |
| WO | 2018057437 | 3/2018 |
| WO | 2018232262 | 12/2018 |
| WO | 2019238272 | 12/2019 |
| WO | 2020094252 A1 | 5/2020 |
| WO | 2020144090 A1 | 7/2020 |

\* cited by examiner

ELECTRONIC LOCKING DIFFERENTIAL WITH POSITION SENSOR

CROSS-REFERENCE TO RELATED APPLICATIONS

This application is a National Stage Application of PCT/EP2022/025084 filed Mar. 7, 2022; which claims the benefit of and priority to U.S. Provisional Application No. 63/157,017, filed Mar. 5, 2021; which applications are hereby incorporated herein by reference. To the extent appropriate, a claim of priority is made to each of the above-disclosed applications.

FIELD OF THE INVENTION

The invention relates to electrically locking differential assemblies having a lock position sensor.

BACKGROUND OF THE INVENTION

Axle integrators often use automated assembly equipment to install a ring gear on to a differential. The automated equipment in turn may require that an electronic actuator be positioned behind a ring gear flange. Such a configuration presents packaging challenges as the inner diameter of the assembly is constrained by the differential bearing, the outer diameter is constrained by the ring gear bolts and the axial length is constrained by the differential flange and a bearing cap. It is therefore a challenge to include a position sensor in such an assembly to measure a position of an armature of the electronic actuator.

There is therefore a need in the art for a position sensor that indicates a locked or unlocked state of a differential and fits within the above defined packaging constraints. There is a need in the art for a position sensor that is accurate and allows for rotation of the ring gear while avoiding potential measurement inaccuracies of an axial position of the armature.

SUMMARY OF THE INVENTION

In one aspect, there is disclosed an electronic locking differential assembly that includes a ring gear including at least one bore formed therein. An electronic actuation mechanism is positioned behind the ring gear on one side of the ring gear. A retaining ring includes a notch formed thereon on an outer circumference of the retaining ring. A portion of the electronic actuation mechanism is disposed in the notch. A lock plate is positioned on a side of the ring gear opposite the electronic actuation mechanism. The retaining ring includes a bore formed therein and a fastener disposed in the bore. The fastener is coupled to the retaining ring and passes through the at least one bore of the ring gear. The fastener is coupled to the lock plate wherein the electronic actuation mechanism is axially connected to the lock plate selectively locking and unlocking the differential.

In another aspect, there is disclosed an electronic locking differential assembly that includes a ring gear including at least one bore formed therein. An electronic actuation mechanism is positioned behind the ring gear on one side of the ring gear. A retaining ring includes a notch formed thereon on an outer circumference of the retaining ring. A portion of the electronic actuation mechanism is disposed in the notch. A lock plate is positioned on a side of the ring gear opposite the electronic actuation mechanism. The retaining ring includes a bore formed therein and a fastener disposed in the bore. The fastener is coupled to the retaining ring and passes through the at least one bore of the ring gear. The fastener is coupled to the lock plate wherein the electronic actuation mechanism is axially connected to the lock plate selectively locking and unlocking the differential. Anti-rotation tabs are attached to the ring gear. The anti-rotation tabs pass through rotation notches formed in a stator housing and armature preventing rotation of the stator housing and armature relative to each other.

In a further aspect, there is disclosed an electronic locking differential assembly that includes a ring gear including at least one bore formed therein. An electronic actuation mechanism is positioned behind the ring gear on one side of the ring gear. A retaining ring includes a notch formed thereon on an outer circumference of the retaining ring. A portion of the electronic actuation mechanism is disposed in the notch. A lock plate is positioned on a side of the ring gear opposite the electronic actuation mechanism. The retaining ring includes a bore formed therein and a fastener disposed in the bore. The fastener is coupled to the retaining ring and passes through the at least one bore of the ring gear. The fastener is coupled to the lock plate wherein the electronic actuation mechanism is axially connected to the lock plate selectively locking and unlocking the differential. A sensor assembly is attached to the armature at an upper surface of the armature. The sensor assembly includes a sensor housing extending beyond an outer circumference of the armature. A sensor target is attached to a target bracket. The target bracket is fixedly attached to the stator housing fixing an axial position of the sensor target relative to the armature.

DETAILED DESCRIPTION OF THE PREFERRED EMBODIMENTS

Figure 1:
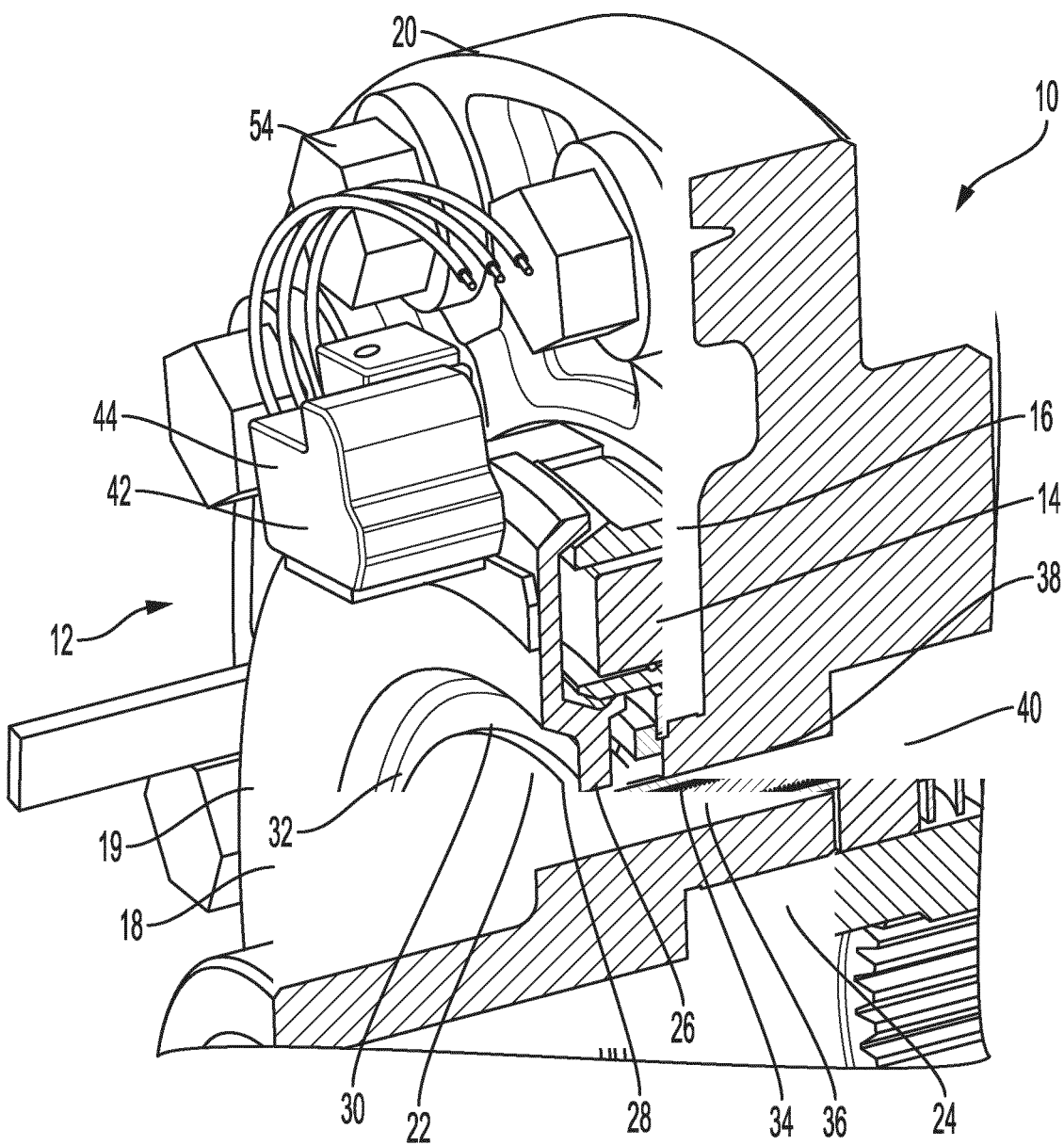
FIG. 1 is a partial perspective sectional view of a differential assembly including a sensor assembly.
Figure 3:
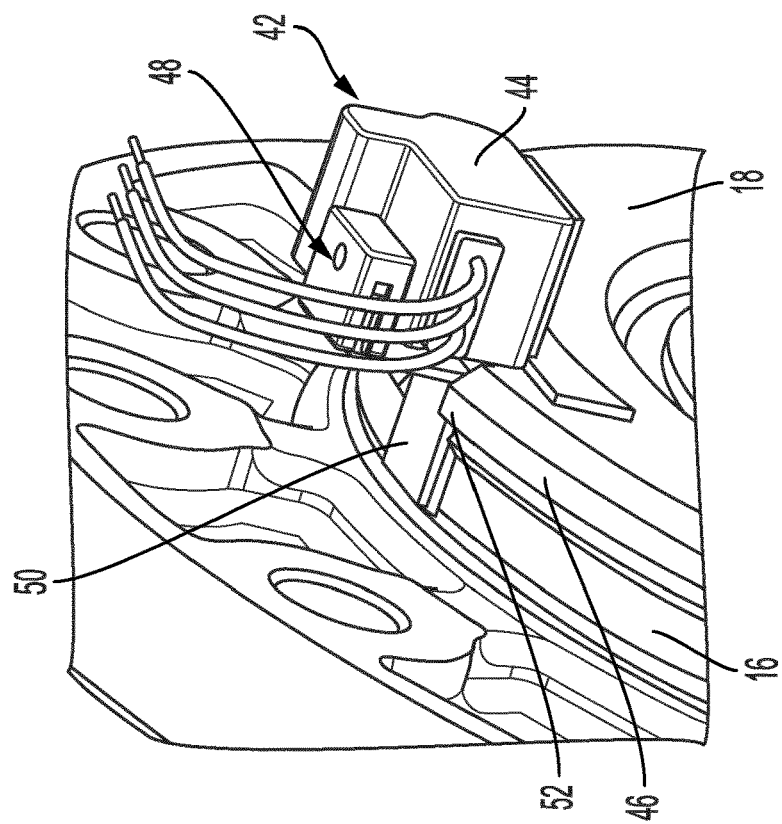
FIG. 3 is a partial perspective view of a sensor assembly.
Figure 2:
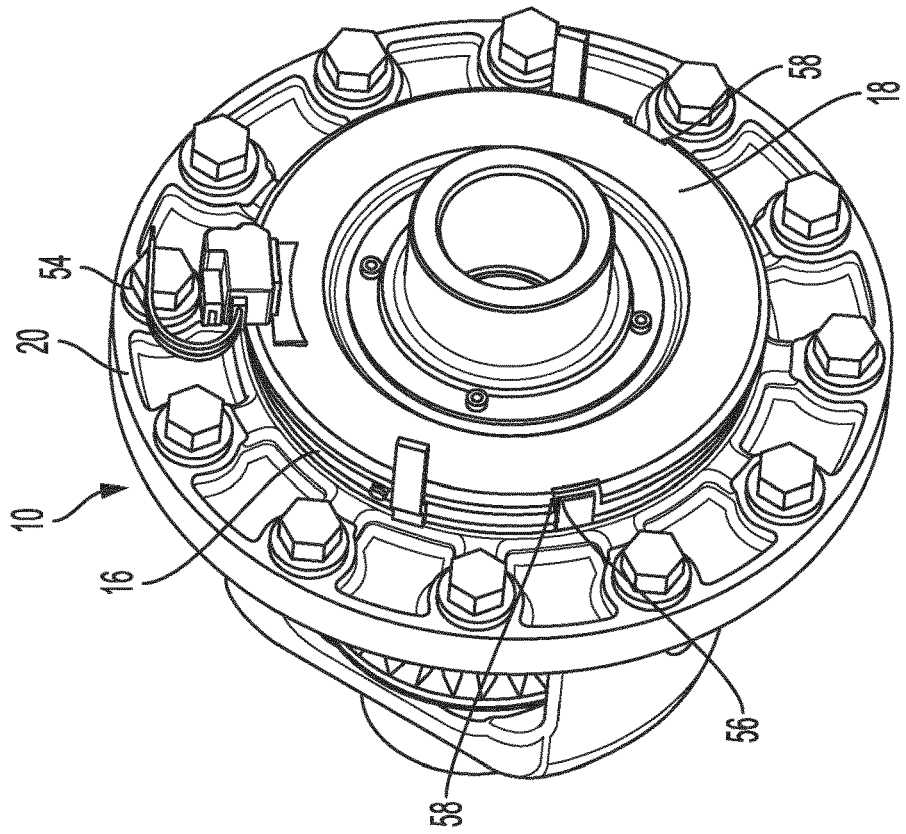
FIG. 2 is a partial perspective view of a differential assembly including a sensor assembly.

Referring to FIGS. 1-4, there is shown a differential assembly 10 that includes an electronic actuation mechanism 12. The electronic actuation mechanism 12 includes a stator 14 that is positioned in a stator housing 16. The stator 14 selectively acts on an armature 18 to lock and unlock the differential assembly 10. The stator 14 and armature 18 are positioned behind ring gear 20 or on a side of the differential away from a lock plate 40 positioned on an opposing side of the ring gear 20.

The armature 18 is retained in a retaining ring 22 disposed about the hub 24. The retaining ring 22 includes a notch 26 defined by two halves 28 which when joined forms the notch 26 about the outer circumference edge 30 of the retaining ring 22. The inner portion 32 of the armature 18 is disposed in the notch 26 linking the armature 18 and the retaining ring 22 for axial movement, as will be described in more detail below.

The retaining ring 22 includes a bore 34 formed therein receiving a fastener 36. The fastener 36 passes through the bore 34 in the retaining ring 22 and through a bore 38 formed in the ring gear 20. The fastener 36 is coupled with a lock plate 40 that locks and unlocks the differential assembly 10.

The notch 26 allows free rotational movement while transmitting axial motion from the armature 18 to the lock plate 40.

A sensor assembly 42 is attached to the armature 18 at an upper surface 19 of the armature 18. In one aspect, the sensor assembly 42 may include a Hall-effect sensor. The sensor assembly 42 is attached to the armature 18 such that the sensor housing 44 extends beyond the outer circumference 46 of the armature 18 such that it overhangs the armature 18. The sensor assembly 42 includes a sensor target 48. The sensor target 48 is attached to a target bracket 50, best shown in FIG. 3. The target bracket 50 passes through a notch 52 in the armature 18 and is fixedly attached to the stator housing 16 such that the sensor target 48 is fixed axially relative to the armature 18. Such a fixed relationship maintains the relationship of the sensor housing 44 and target 48 for accurate measurements.

The differential assembly 10 includes a ring gear 20 that is attached to the differential case using ring gear fasteners 54. The ring gear 20 and differential case rotate when the differential assembly 10 is in operation. There is a need to prevent the sensor assembly 42 from contacting the ring gear fasteners 54 as the ring gear 20 rotates. The sensor assembly 42 is therefore positioned such that there is a clearance C1 relative to the ring gear fasteners 54, best seen in FIG. 4.

The sensor housing 44 may include a generally rectangular shape 45 with an extending leg 47 to define a sensor target notch 49. The sensor target 48 is positioned within the sensor target notch 49. The extending leg 47 may include a shaped or rounded corner 51 to provide the clearance C1. The shape of the sensor housing 44 and the amount of overhang or attachment position to the armature 18 of the sensor assembly 42 as discussed above define the clearance C1. The clearance C1 allows rotation of the differential assembly 10 without inference with the sensor assembly 42.

The differential assembly 10 includes anti-rotation tabs 56 attached to the ring gear 20. The anti-rotation tabs 56 pass through rotation notches 58 formed in the stator housing 16 and armature 18 preventing rotation of the stator housing 16 and armature 18 relative to each other, best seen in FIG. 2. The anti-rotation tabs 56 allow axial movement of the armature 18 relative to the stator 14.

Figure 4:
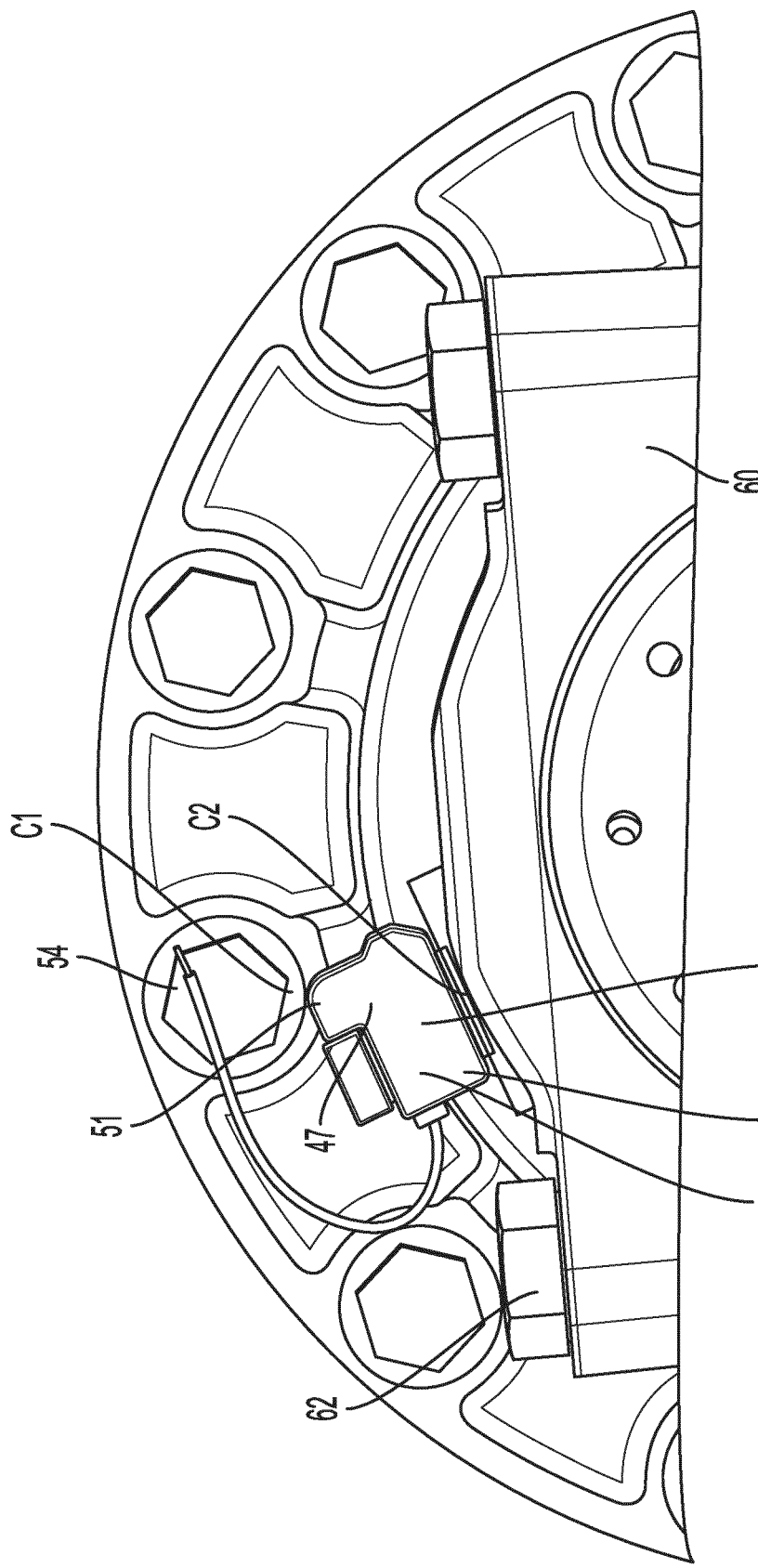
FIG. 4 is a partial perspective view of a differential assembly including a sensor assembly including a bearing cap.

When the differential assembly 10 is connected to an axle for a vehicle, a bearing cap 60 is attached to the differential assembly 10, best shown in FIG. 4. The sensor assembly 42 includes a clearance C2 relative to the bearing cap 60 and bearing cap fasteners 62 used to attach the bearing cap 60. The clearance C2 allows rotation of the differential assembly 10 without inference with the sensor assembly 42.

In use, the stator 14 may be selectively energized to lock and unlock the differential assembly 10. The stator 14 moves the armature 18 axially relative to the stator 14. Axial movement of the armature 18 is transferred through the retaining ring 22 to the lock plate 40 locking and unlocking the differential assembly 10. The armature 18 and stator housing 16 are rotatively coupled by the anti-rotation tabs 56 such that the sensor housing 44 maintains a rotative position relative to the target 48.

Axial movement of the armature 18 may be detected by the sensor assembly 42 due to axial movement of the sensor housing 44 relative to the target 48. The sensor information may be transmitted to a controller or other control module to indicate when the differential assembly 10 is locked or unlocked.

The invention claimed is:

1. An electronic locking differential assembly comprising:
    a ring gear including at least one bore formed therein;
    an electronic actuation mechanism positioned behind the ring gear on one side of the ring gear;
    a retaining ring including a notch formed thereon on an outer circumference of the retaining ring, wherein a portion of the electronic actuation mechanism is disposed in the notch;
    a lock plate positioned on a side of the ring gear opposite the electronic actuation mechanism;
    wherein the retaining ring includes a bore formed therein and a fastener disposed in the bore, the fastener coupled to the retaining ring and passing through the at least one bore of the ring gear and the fastener coupled to the lock plate, wherein the electronic actuation mechanism is axially connected to the lock plate selectively locking and unlocking the electronic locking differential assembly.

2. The electronic locking differential assembly of claim 1, wherein the electronic actuation mechanism includes a stator disposed in a stator housing, the stator selectively acting upon an armature moving the armature axially relative to the stator.

3. The electronic locking differential assembly of claim 2 wherein an inner portion of the armature is disposed in the notch.

4. The electronic locking differential assembly of claim 2 including a sensor assembly attached to the armature at an upper surface of the armature.

5. The electronic locking differential assembly of claim 4 wherein the sensor assembly includes a sensor housing extending beyond an outer circumference of the armature.

6. The electronic locking differential assembly of claim 4 wherein the sensor assembly includes a sensor target attached to a target bracket, the target bracket fixedly attached to the stator housing fixing an axial position of the sensor target relative to the armature.

7. The electronic locking differential assembly of claim 1, further including anti-rotation tabs attached to the ring gear, the anti-rotation tabs passing through rotation notches formed in a stator housing and an armature, preventing rotation of the stator housing and the armature relative to each other.

8. The electronic locking differential assembly of claim 7 wherein the rotation notches allow axial movement of the armature relative to the stator.

9. The electronic locking differential assembly of claim 4, wherein the ring gear includes ring gear fasteners attached thereon, and wherein the sensor assembly is attached on the armature and overhangs from the armature a specified distance defining a clearance of the sensor assembly relative to the ring gear fasteners, allowing rotation of the ring gear without inference with the sensor assembly.

10. The electronic locking differential assembly of claim 5 wherein the sensor housing includes a rectangular shape having an extending leg defining a sensor target notch.

11. The electronic locking differential assembly of claim 10 including a sensor target positioned in the sensor notch.

12. An electronic locking differential assembly comprising:
    a ring gear including at least one bore formed therein;
    an electronic actuation mechanism positioned behind the ring gear on one side of the ring gear,
    a retaining ring including a notch formed thereon on an outer circumference of the retaining ring, wherein a portion of the electronic actuation mechanism is disposed in the notch;
    a lock plate positioned on a side of the ring gear opposite the electronic actuation mechanism;

wherein the retaining ring includes a bore formed therein and a fastener disposed in the bore, the fastener coupled to the retaining ring and passing through the at least one bore of the ring gear and the fastener coupled to the lock plate, wherein the electronic actuation mechanism is axially connected to the lock plate selectively locking and unlocking the electronic locking differential assembly; and anti-rotation tabs attached to the ring gear, the anti-rotation tabs passing through rotation notches formed in a stator housing and an armature preventing rotation of the stator housing and the armature relative to each other.

13. An electronic locking differential assembly comprising:
   a ring gear including at least one bore formed therein;
   an electronic actuation mechanism positioned behind the ring gear on one side of the ring gear,
   a retaining ring including a notch formed thereon on an outer circumference of the retaining ring, wherein a portion of the electronic actuation mechanism is disposed in the notch;
   a lock plate positioned on a side of the ring gear opposite the electronic actuation mechanism;
   wherein the retaining ring includes a bore formed therein and a fastener disposed in the bore, the fastener coupled to the retaining ring and passing through the at least one bore of the ring gear and the fastener coupled to the lock plate, wherein the electronic actuation mechanism is axially connected to the lock plate selectively locking and unlocking the electronic locking differential assembly; and
   a sensor assembly attached to an armature at an upper surface of the armature, wherein the sensor assembly includes a sensor housing extending beyond an outer circumference of the armature and including a sensor target attached to a target bracket, the target bracket fixedly attached to a stator housing fixing an axial position of the sensor target relative to the armature.

* * * * *